SEMIPARALLEL CONTENT ADDRESSABLE MEMORY

Filed Dec. 13, 1963 2 Sheets-Sheet 1

INVENTOR.
ALFRED D. SCARBROUGH
BY Arthur Freilich
ATTORNEY

ALFRED D. SCARBROUGH
INVENTOR.

BY Arthur Frelich

ATTORNEY

United States Patent Office 3,500,350

Patented Mar. 10, 1970

3,500,350

SEMIPARALLEL CONTENT ADDRESSABLE MEMORY

Alfred D. Scarbrough, Northridge, Calif., assignor, by mesne assignments, to The Bunker-Ramo Corporation, Stamford, Conn., a corporation of Delaware Filed Dec. 13, 1963, Ser. No. 330,396
Int. Cl. G11b 5/00
U.S. Cl. 340—174 10 Claims

ABSTRACT OF THE DISCLOSURE

A non-destructive readout content addressable memory system comprised of a magnetic core matrix defining a plurality of word locations, each location containing one core per stored information bit with all cores of the same location being traversed by a common word sense line. An all "0's" word location and an all "1's" word location are provided together with means for selectively connecting the sense lines of either of these two locations in opposition to the sense lines of all of the other locations. Semiparallel searches are conducted by initially interrogating all core columns corresponding to search word bits of a first state (e.g. "1" and subsequently interrogating all core columns corresponding to search word bits of a second state (e.g. "0").

This invention relates generally to digital memories and more particularly to improvements in content addressable type memories, such memories being characterized by having the ability to permit all words stored in the memory to be searched in parallel, i.e. simultaneously.

U.S. Patent No. 3,031,650 discloses some basic content addressable memory implementations and discusses the characteristics which distinguish such memories from conventional digital memories. Briefly, the significant distinguishing characteristic is that each memory location in a content addressable memory is not uniquely identified by an address as in conventional digital memories but instead content addressable memory locations are selected on the basis of information stored therein; i.e. the contents thereof. Hence, the name content addressable memory.

As a result of selecting locations on the basis of stored information, memory search times can be considerably reduced at the cost of some additional hardware. That is, in situations where it is desired to select those locations, out of $n$ locations in memory, storing information (words) identical to a search word, information identifying those locations can be derived in one memory access period instead of the $n$ such periods required by conventional digital memories. More particularly, whereas it is necessary in a conventional digital memory to sequentially access the contents of each location (a word) and compare each such word for identity with a search word, comparison of the search word with all the stored words can be simultaneously effected in a content addressable memory.

Essentially, a content addressable memory operates by causing a signal representative of a search word bit to be applied simultaneously to all memory location elements storing bits of corresponding significance. Some type of logic means is provided in the memory,. such means being operable to generate signals to indicate whether the bits stored in the various memory location elements are the same as or different from the corresponding search bit being sought. All elements of a single memory location are coupled to a common word sense line and by sensing resultant signals appearing on the word sense line, a determination is made as to whether or not the word stored in the memory location associated with the word sense line matches or mismatches the search word.

Whereas the content addressable memory embodiment disclosed in the aforementioned U.S. Patent No. 3,031,-650 utilizes means (e.g. a flip-flop or a pair of non-destructive readout magnetic cores) capable of providing both true and complementary manifestations for each stored information bit so as to permit all stored bits to be considered in parallel, as well as all stored words being considered in parallel, U.S. Patent No. 3,297,995, filed Mar. 29, 1963, by Ralph J. Koerner and Alfred D. Scarbrough and assigned to the same assignee as the present application, discloses a content addressable memory requiring only a single element (e.g. a non-destructive readout magnetic core) for each stored bit by causing the bits of the stored words to be considered serially or sequentially, while the words are still considered in a parallel fashion. In addition to the hardware reduction derived from a sequential, rather than a parallel consideration of the bits, several other advantages which are discussed in the above-cited application and will only briefly be mentioned here, are introduced. An initial advantage is that considerably higher signal-to-noise ratios are available on the word sense lines if only one element coupled thereto is operated on at a time. The provision of higher signal-to-noise ratios of course means that less critically designed and less expensive sense amplifiers can be employed. A second and very significant advantage is that by considering bits sequentially, very many useful searches, other than equality, can be performed; e.g. "greater than" and "less than" magnitude comparison searches can be easily performed as disclosed in the above-cited patent application.

Although not essential to a clear understanding of the present invention, it is pertinent to observe that in one form of the invention set forth in the above-cited patent application, bit equality decisions are made at each memory element. That is, all memory elements storing bits having the same degree of significance are simultaneously compared with a corresponding bit of the search word and an equality decision is made at each such memory element such that the memory element provides a mismatch signal on a word sense line associated therewith whenever it stores a bit which mismatches the corresponding search bit. The sets of memory elements storing bits having different degrees of significance are considered sequentially. All memory elements forming part of a common memory location; i.e. storing bits common to a single word are associated with the same word sense line and as a consequence, by sensing whether or not a mismatch signal appears on a particular word sense line, a conclusion can be drawn as to whether the stored word associated therewith matches the search word.

The content addressable memory in the cited application may be implemented by utilizing magnetic memory elements to which are coupled binary interrogation signals such that a first interrogation signal will cause a memory element to provide opposite polarity output pulses to respectively indicate its two possible states and a second interrogation signal will cause the memory element to provide output pulses opposite to those provided in response to the first interrogation signal. Although each memory element therefore provides either a match or mismatch signal depending upon whether the binary state represented by the interrogation signal is different from or the same as the bit stored by the element, preferably only mismatch signals appearing on the word sense lines are sensed. The binary interrogation signals are respectively manifested by increasing and decreasing currents on a digit interrogate line in accordance with corresponding search word bits stored in a search word register. Each digit interrogate line is associated with magnetic memory elements storing bits of the same significance.

In U.S. Patent No. 3,292,159 by Ralph J. Koerner and assigned to the same assignee as the present application, a significantly different content addressable memory is disclosed in which bits are considered sequentially but which relies on developing a difference between output signals identifying the search bit and a stored bit of corresponding significance, in lieu of using the binary interrogation signal technique of the initially cited application. Three embodments are disclosed in the latter cited application. In an initial embodiment, the search word may be stored in one of the memory locations with the word sense line associated therewith being connected to a first input terminal of a plurality of differential sense amplifiers, each differential sense amplifier having a second input terminal connected to a different one of the other word sense lines. Digit interrogate lines couple all memory elements storing bits of corresponding significance and consequently, in response to an interrogation signal provided on any digit interrogate line, output signals respectively representing the search bit and a stored bit of corresponding significance are applied to each differential sense amplifier. The differential sense amplifier of course will provide an output signal, constituting a mismatch signal, only when the two signals applied thereto are different.

In a second embodiment of U.S. Patent No. 3,292,159 in lieu of using differential sense amplifiers, the search word memory location word sense line may be connected in opposition to each of the other memory location word sense lines so that cancellation of memory element output signals will occur only in match situations thereby easily permitting a conventional sense amplifier to detect a mismatch situation. The search word memory location word sense line can be connected in opposition to the other word sense lines by merely connecting a first terminal thereof to a reference potential and a second terminal thereof to the terminals on the other word sense lines remote from the sense amplifiers.

In the third embodiment disclosed in U.S. Patent No. 3,292,159, a pair of memory locations is used to store first and second words which respectively are comprised of all "1" bits and all "0" bits. The word sense lines respectively associated with these locations can be connected in opposition to the other memory location word sense lines by a single pole double throw switch means which can be operated in accordance with the states of successive search word bits stored in a data register.

All of the embodiments disclosed in U.S. Patent No. 3,292,159 require the utilization of only one memory element per stored information bit inasmuch as although searches are conducted in parallel with respect to words, they are conducted in sequence with respect to bits. As noted, a sequential consideration of the bits permits searches other than equality, e.g. magnitude comparison, to be conducted. Moreover, all of the embodiments utilize some type of scanner means to sequentially initiate an interrogation period with respect to each search bit, the interrogation periods being permitted to overlap so as to minimize the total required search time.

The present invention is based on the recognition that in a content addressable memory utilizing only one memory element per stored information bit, where equality searches only are to be performed, search times can be further reduced by modifying the third embodiment of U.S. Patent No. 3,292,159 to cause a semiparallel search to be performed. That is, regardless of the word length employed, all words in memory can be compared with a search word in only two interrogation periods, i.e. one period for comparing stored bits with respect to "0" search bits and another period for comparing stored bits with respect to "1" search bits, instead of a number of interrogation periods, albeit they may overlap, equal to the number of bits in the search word.

The novel features that are considered characteristic of this invention are set forth with particularity in the appended claims. The invention itself both as to its organization and method of operation, as well as additional objects and advantages thereof, will best be understood from the following description when read in connection with the accompanying drawings, in which:

FIGURE 2($b$) is a waveform chart illustrating the operation of the memory element of FIGURE 2($a$)

Figure 1:
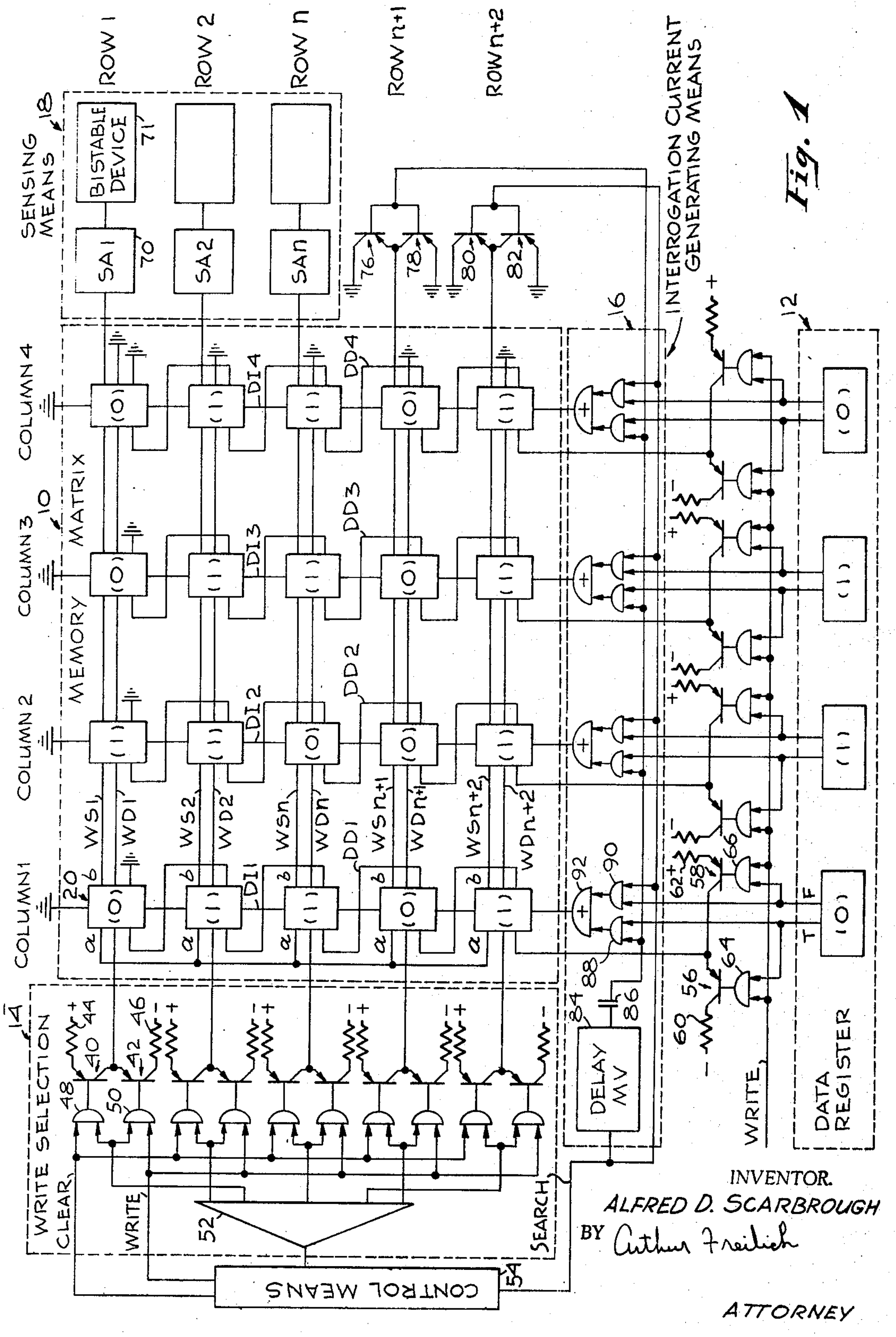
FIGURE 1 is a schematic block diagram of a content addressable memory embodiment constructed in accordance with the present invention.

Attention is now called to FIGURE 1 which illustrates a content addressable memory constructed in accordance with the present invention and including a rectangular memory matrix 10 comprised of a plurality of memory elements, a data register 12 for storing either a search word or a word to be written into the memory, write selection means 14 for selecting a location into which a word is to be written, interrogation current generating means 16 for applying interrogation currents to digit interrogate lines, and sensing means 18 for sensing whether each stored bit matches or mismatches a corresponding search word bit.

The exemplary matrix 10 includes $n+2$ rows of memory elements 20, each row comprised of Q memory elements each forming part of a different one of Q columns. Each of the memory elements 20 constitutes a bistable device thereby enabling it to assume first and second states respectively representative of binary digits or bits, namely "0" and "1." Each of the matrix rows can appropriately be referred to as a memory location, each location being capable of storing a bit pattern constituting a single word. Although the exemplary memory illustrated herein makes use of a four bit word length (i.e. $Q=4$), and provides three searchable memory locations (i.e. $n=3$), it is pointed out that a memory based upon any arbitrary word length and any number of searchable memory locations can be constructed in accordance with the invention. It should also be understood that although a matrix of memory elements comprised of "columns" and "rows" has been referred to, the actual physical orientation of the elements relative to one another is generally of little import.

Each of the Q matrix columns consists of a plurality of memory elements 20 each of which serves to store information of corresponding significance in a different row or memory location. That is, words may in fact represent numerical quantities and it is common practice to place bits of corresponding significance in such words in correspondingly positioned memory elements. For example, binary information can be stored in the elements of the memory matrix such that the elements in column 1 of the matrix respectively store the most significant bit of each stored word and the elements of columns 2 through 4 in the matrix respectively store bits of decreasing significance.

A digit interrogate line DI1 is associated with all of the memory elements 20 in column 1 of the matrix. Similarly, digit interrogate lines DI2, DI3, and DI4 are each correspondingly associated with all the memory elements of respectively different ones of the columns 2, 3, and 4 of the matrix. On the other hand, a word sense line WS1 is associated with all of the memory elements in row 1 of the matrix. Similarly, word sense lines WS2, WS$n$, WS$n+1$, and WS$n+2$ are correspondingly associated with the memory elements of rows 2, $n$, $n+1$ and $n+2$ of the matrix. In addition, a word drive line WD1 is associated with all of the memory elements in row 1 of the matrix. Similarly, word drive lines WD2, WD$n$, WD$n+1$, and WD$n+2$ are correspondingly associated with the memory elements of matrix rows 2, $n$, $n+1$ and $n+2$. Further, a digit drive line DD1 is associated with all of the memory elements of matrix column 1 and similarly, digit drive lines DD2, DD3, and DD4 are each correspondingly associated with all of the memory elements of respectively different ones of the matrix columns 2, 3, and 4.

Figure 2A:
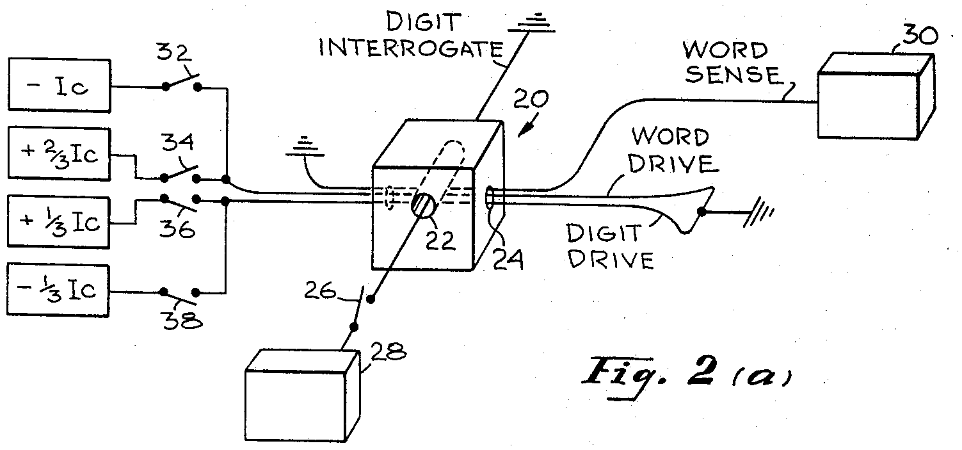
FIGURE 2($a$) is a perspective view of a typical memory element which can be suitably employed in the embodiment of FIGURE 1.
Figure 2B:
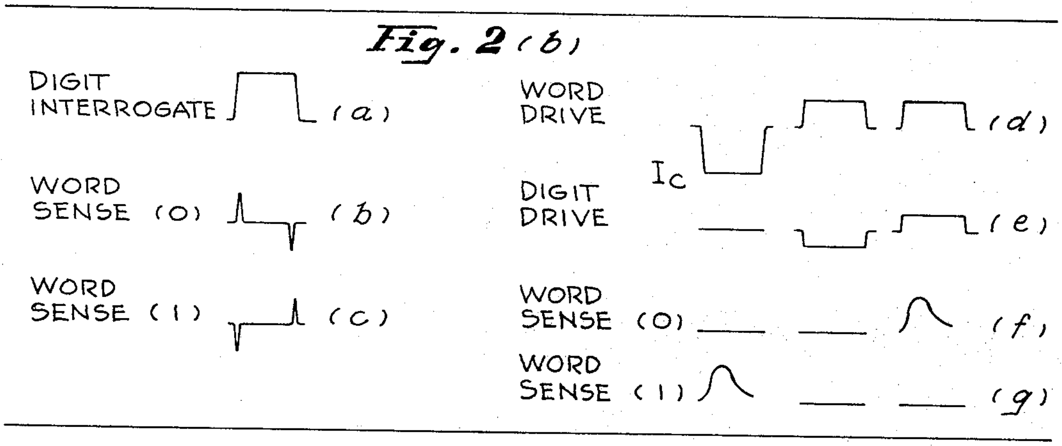

Attention is now momentarily called to FIGURE 2($a$) showing a perspective view of a structural device constituting a non-destructive readout memory element which could be utilized in the memory matrix 10 of FIGURE 1, the operational characteristics of the memory element of FIGURE 2($a$) being illustrated in FIGURE 2($b$).

FIGURE 2($a$) illustrates a magnetic memory element 20 commonly called a Biax. Such an element comprises a block of magnetic material having apertures 22 and 24 extending therethrough perpendicularly to one another. A digit interrogate line is threaded through the aperture 22 while a word sense line, a word drive line, and a digit drive line are all threaded through the aperture 24. The digit interrogate line is utilized as a conduction path for carrying current to interrogate the state of the element 20 and is connected between a source of reference potential, as ground, and a switch 26 which in turn is connected to a current source 28. The word sense line is utilized to sense the state of the element 20 and is connected between a source of reference potential, as ground, and a sensing device 30.

The word drive line is connected between a source of reference potential, as ground, and a pair of switches 32 and 34 which are respectively connected to current sources providing currents $-I_c$ and $+\frac{2}{3}I_c$. The switches 32 and 34 can be closed independently but cannot both be closed at the same time. The current $I_c$ represents a current magnitude sufficient to switch the direction of the flux in the magnetic element 20. Closure of the switch 32 therefore has the effect of providing a current having a magnitude $I_c$ on the word drive line in a negative direction and hence will be considered as causing a flux orientation in the element 20 representative of a "0" bit. Closure of the switch 34 will provide a current $\frac{2}{3}I_c$ in a positive direction on the word drive line which of course is intended to be insufficient to change the direction of the flux in the element 20. The digit drive line is also connected between a reference potential, as ground, and a pair of switches 36 and 38. Switch 36 is connected to a source of current $+\frac{1}{3}I_c$ and switch 38 is connected to a source of current $-\frac{1}{3}I_c$. Switches 36 and 38 cannot be closed at the same time. In order to write information into the memory element 20, the information in the memory element is initially cleared to "0" by closing switch 32. Then, the new information is written in by closing switch 34 and switch 36 if a "1" is to be written. On the other hand, switch 38 is closed if the new information bit is "0." Although ideally, the current $-\frac{1}{3}I_c$ would not be necessary, as a practical matter in the utilization of the Biax, it is necessary to assure that the current $+\frac{2}{3}I_c$ applied to the word drive line alone does not switch the memory element 20 to its "1" state.

FIGURE 2($b$) is a waveform chart illustrating the signals appearing on the various memory element lines in the course of writing in and reading out. In order to determine the state of the element 20, the switch 26 in the digit interrogate line is closed to thereby initiate a positive current pulse on the digit line as illustrated in line ($a$) of FIGURE 2($b$). If it is initially assumed that the memory element 20 stores a "0," as a result of the current in the digit interrogate line, a positive voltage pulse will be initially generated on the word sense line followed by generation of a negative pulse. If on tthe other hand, the element 20 stores a "1," the current pulse in the digit interrogate line initially causes a negative voltage pulse to appear on the word sense line followed by the appearance of a positive pulse. It is pointed out that state interrogations are accomplished in a non-destructive manner. That is, although the current driven through the digit interrogate line will induce voltage pulses on the word sense line, the current will not change the state of the memory element 20. The state of the element of course can be determined by conventional sense amplifiers which sense whether the initial pulse appearing on the word sense line is positive or negative. If a positive pulse is initially generated followed by a negative pulse, the element 20 of course stores a "0" and on the other hand, if a negative voltage pulse is initially generated followed by a positive pulse, the element 20 stores a "1."

Note in line ($d$) of FIGURE 2($b$) that when a current $-I_c$ is applied to the word drive line, as by closing switch 32, an output pulse will be provided on the word sense line if the memory element stores a "1," as a result of the flux in the element 20 switching direction. On the other hand, note that when a current $+\frac{2}{3}I_c$ is applied to the word drive line and a current $-\frac{1}{3}I_c$ is applied to the digit drive line, no noticeable response appears on the word sense line meaning that there is no significant amount of flux switching in the memory element 20 which takes place. However, when the current $+\frac{2}{3}I_c$ is applied to the word drive line simultaneously with the application of a current $+\frac{1}{3}I_c$ to the digit drive line, a pulse will appear on the word sense line if the memory element 20 stores a "0."

Although, for purposes of illustration, the utilization of a Biax memory element has been assumed herein, any memory element which can be read non-destructively can be substituted for the Biax element in the content addressable memory of FIGURE 1.

Returning to FIGURE 1, it is pointed out that each of the word drive lines is connected between ground and a pair of transistor switches 40 and 42 which correspond to switches 32 and 34 of FIGURE 2($a$). Each of the word drive lines is connected to the collector of transistor switch 40, the emitter of transistor switch 40 being connected through a resistor 44 to a source of positive potential. The word drive line in addition is connected to the emitter of transistor switch 42 whose collector is connected through a resistor 46 to a source of negative potential. The bases of the transistors 40 and 42 are respectively connected to the outputs of AND gates 48 and 50 which, when enabled, provide a negative potential suitable to forward bias the transistor switches. The values of the resistors 44 and 46 are chosen such that when AND gate 48 is enabled, the transistor 40 will be forward biased so as to establish a current $I_c$ in the word drive line and when AND gate 50 is enabled, transistor 42 will be forward biased so as to establish a current $\frac{2}{3}I_c$ in an opposite direction in the word drive line.

A decoder circuit 52 is provided which has a plurality of output terminals, each of which corresponds to one of the rows of the memory matrix 10. Each output terminal is connected to the input of a different pair of AND gates 48 and 50. In addition, a control means 54 is provided which has a "clear" output terminal, a "write" output terminal, a "search" output terminal and a "decoder input" output terminal. The clear and write output terminals are respectively connected to the inputs of all AND gates 48 and 50. The decoder input output terminal provides the input to the decoder 52 which uniquely identifies one of its output terminals and correspondingly one of the matrix rows.

The digit drive lines are similarly connected between ground and a pair of transistor switches 56 and 58 which respectively correspond to the switches 36 and 38 of FIGURE 2($a$). Each of the digit drive lines is connected to the emitter of transistor 56 whose collector is connected through a resistor 60 to a source of negative potential, and to the collector of transistor 58 whose emitter is connected through a resistor 62 to a source of positive potential. AND gates 64 and 66 are connected to the bases of transistors 56 and 58, and when enabled, provide a forward biasing negative potential thereto. The values of the resistors 60 and 62 are chosen to be equal such that when either of the AND gates 64 or 66 is enabled, a current having the magnitude $\frac{1}{3}I_c$ will either be conducted downwardly in the digit drive line through transistor 56 or upwardly in the digit drive line through transistor 58.

Information to be written into any of the locations in the memory matrix is initially entered into a data register 12 comprised of four flip-flop stages, each flip-flop having true and false output terminals. The true and false output terminals of each of the flip-flops are respectively connected to the inputs of associated AND gates 64 and 66. The write output terminal of the control means 54 is connected to the input of all of the AND gates 64 and 66.

In order for information to be written into the memory matrix 10, the control means 54 initially provides a true signal on its clear output line and in addition provides suitable signals to the decoder 52 identifying one of the matrix rows. As a consequence, each of the memory elements in the identified row is cleared to a "0" state. Subsequently, the control means provides a true signal on its write output terminal thereby causing a current $+\frac{2}{3}I_c$ to be provided on the word drive line identified by the decoder 52 and currents of either $+\frac{1}{3}I_c$ or $-\frac{1}{3}I_c$ to be developed on the digit drive lines in accordance with the contents of the data register 12. Thus, it can be seen that information can be selectively entered into the memory matrix 10.

In accordance with the invention herein, a pair of reference words, respectively consisting of all "0" bits and all "1" bits are respectively stored in the row $n+1$ and row $n+2$ locations of the memory matrix. A search word is entered into the data register 12 (by means not shown). A search to locate all words stored in the memory matrix which are identical to the search word is performed by initially comparing each of the "1" search bits with the correspondingly positioned bits of the stored words, and subsequently the "0" search bits with the correspondingly positioned bits of the stored words. Briefly, comparison of a search bit with a corresponding stored bit is effected by providing an interrogation current on the digit interrogate line associated with the search bit and stored bit under consideration. The application of the interrogation current will cause the memory elements storing the stored bit to provide an output signal on its associated word sense line representative of its state. In addition, the application of the interrogation current to the digit interrogate line will cause the elements in rows $n+1$ and $n+2$ to respectively provide output signals on the row $n+1$ and $n+2$ word sense lines representative of a "0" bit and a "1" bit. By connecting either the row $n+1$ word sense line or the row $n+2$ word sense line in opposition to the word sense lines on which the stored bit output signals appear, cancellation will be effected on those word sense lines associated with a matching stored bit while a signal equal to substantially twice the signal derivable from one memory element will appear at the input to the sense amplifiers 70 connected to a word sense line associated with a mismatching stored bit.

The row $n+1$ word sense line can be connected in opposition to each of the other word sense lines, that is the row 1, row 2, and row $n$ word sense lines, by connecting the right-hand terminal thereof to a source of reference potential, such as circuit ground. The left-hand terminal of the row $n+1$ word sense line is connected to the left-hand terminal of the other word sense lines which have their right-hand terminals connected to the input of the sense amplifiers 70. Grounding of the right-hand terminal of the row $n+1$ word sense line is accomplished by forward biasing transistors 76 and 78. The row $n+1$ word sense line is connected to the emitter of transistor 76 whose collector is connected to ground and to the collector of transistor 78 whose emitter is connected to ground. Similarly, the row $n+2$ word sense line can be connected in opposition to the other word sense lines by forward biasing transistors 80 and 82. The row $n+2$ word sense line is connected to the emitter of transistor 80 whose collector is connected to ground and to the collector of transistor 82 whose emitter is connected to ground.

In order to initiate a search, the control means 54 provides a true output pulse (which will be assumed to be negative) on its search output terminal which is coupled to the bases of transistors 80 and 82. In addition, the search output terminal of control means 54 is connected to the set input terminal of a delay multivibrator 84. In response to the application of the true input signal to the set input terminal of the delay multivibrator, the delay multivibrator will switch to a true state for a short interval and will subsequently switch back to a false state. The transition of the delay multivibrator from a true to a false state is coupled through a capacitor 86 to the bases of transistors 76 and 78. Thus, it should be apparent that in response to the provision of a true output signal by the control means 54 on its search output terminal, initially the word sense line of row $n+2$ will be connected in opposition to the other memory word sense lines and subsequently, the row $n+1$ word sense line will be connected in opposition to the other word sense lines.

When the row $n+2$ word sense line is connected in opposition, interrogation currents must be provided on those digit interrogate lines corresponding to "1" search bits. In order for this to occur, the true and false output terminals of each of the data register stages are respectively connected to the inputs of AND gates 88 and 90. The search output terminal of the control means is also connected to the input of AND gate 88 while the output of capacitor 86 is connected to the input of AND gate 90. The outputs of AND gates 88 and 90 are connected to the inputs of OR gate 92 which in turn is uniquely connected to a digit interrogate line. Accordingly, when the control means 54 provides a true output signal on the search output terminal, those gates 88 which are associated with data register stages storing a bit "1" will be enabled to thereby initiate an interrogation current, through OR gate 92, on the digit interrogate line associated therewith. Similarly, when the delay multivibrator switches from a true to a false state, those AND gates 90 associated with data register stages storing "0" bits will be enabled to initiate interrogation currents on associated digit interrogate lines.

Figure 3:
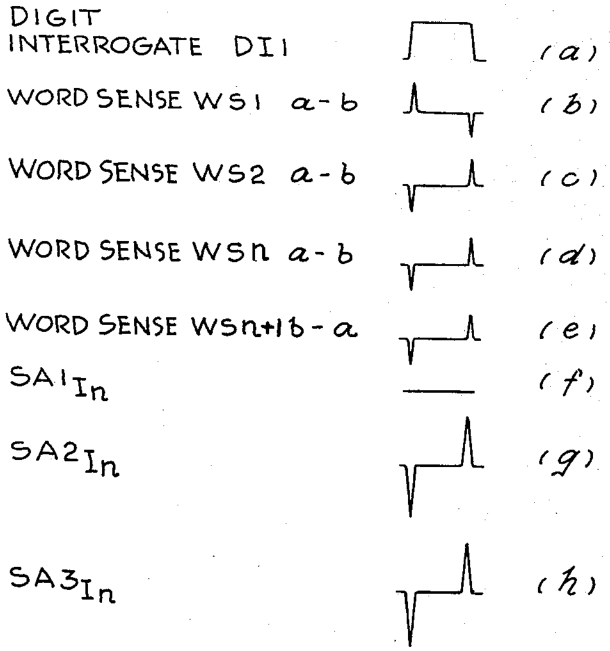
FIGURE 3 is a waveform chart showing various signals developed in the content addressable memory of FIGURE 1.

For a clearer understanding of the operation of the content addressable memory of FIGURE 1, attention is called to the waveform chart of FIGURE 3 which illustrates output signals developed on the various word sense lines in response to the application of an interrogation current to the digit interrogate line DI1, assuming that the various data register stages and memory elements have states as indicated within the parentheses in the blocks of FIGURE 1 which represent them. The point on each of the word sense lines to the left of the column 1 element is identified as point *a* and the point to the right of the element is identified as point *b*. Note that the voltage drop from point *a* to point *b* induced on the word sense line WS1 in response to an interrogate current on the digit interrogate line DI1 will be as illustrated in line (*b*), representing a stored bit "0." The voltage drops appearing between points *a* and *b* of word sense lines WS2 and WS*n* will appear as illustrated in lines (*c*) and (*d*) representing "1" bits. The voltage drop from point *a* to point *b* on word sense line WS*n* will of course be the same as the voltage drop between the corresponding points on word sense line WS1. Inasmuch as the right-hand terminal of word sense line WS*n*+1 is connected to the ground reference, the voltage drop from point *b* to point *a* of the word sense line WS*n*+1 will be added to the voltage drops from points *a* to *b* of the other word sense lines and applied to the inputs of the sense amplifiers 70. Consequently, no input will be provided to the sense amplifier SA1 while inputs having substantially twice the magnitude of an output pulse developed by a single memory element will be provided to the sense amplifiers SA2 and SA$n$ as indicated in lines ($f$), ($g$), and ($h$) of FIGURE 3. The output of each of the sense amplifiers 70 is connected to the set input terminal of a different bistable device 71 (FIGURE 1). As a result of the signals developed on the word sense lines in response to the interrogation current in digit interrogate line DI1, the bistable devices 71 of rows 2 and $n$ will be set so as to indicate that the words stored in matrix rows 2 and $n$ mismatch the search word.

In addition to the interrogate current being generated on the digit interrogate line DI1, an interrogation current is simultaneously generated on the digit interrogate line DI4. The interrogation current on digit interrogate line DI4 will also cause the application of input signals to sense amplifiers SA2 and SA$n$ but will not cause the development of an input signal to sense amplifier SA1 inasmuch as the state of the row 1 column 4 memory element is the same as stage 4 of the data register.

It should be appreciated that in response to the provision of a true output signal on control means search output terminal, interrogation current will be simultaneously applied to digit interrogate lines DI2 and DI3 and that such interrogation currents will result in the application of output signals to the sense amplifiers SA1 and SA$n$ and the cancellation of signals on the word sense line WS2.

Thus, it has been shown that a content addressable memory utilizing only one memory element per stored bit of information can be operated in a semiparallel manner to effect equality searches. More particularly, only two interrogation periods are required to search the memory regardless of the memory word length. One interrogation period is utilized to interrogate the memory with respect to "1" search bits and another interrogation period is utilized to search the memory with respect to "0" search bits. The reason why the "0" and "1" search bits cannot be considered simultaneously to effect a completely parallel search, of course, is because the cancelling signals provided on the word sense lines WS$n$+1 and WS$n$+2 would tend to cancel each other rather than cancelling the signals provided on the other memory word sense lines. That is, if word sense lines WS$n$+1 and WS$n$+2 were simultaneously connected in opposition to the other memory word sense lines, an interrogation current on any one of the digit interrogate lines would cause the development of opposite output signals on the word sense lines WS$n$+1 and WS$n$+2 which would cancel each other therefore having no net effect on the other memory word sense lines.

From the foregoing, it should be apparent that a content addressable memory has been provided herein which requires a minimum amount of time to perform equality searches where only a single memory element per stored bit of information is utilized. Although the concept of performing a semiparallel search has been disclosed in a preferred embodiment of the invention in which two memory locations respectively storing all "1's" and all "0's" are provided for developing cancelling signals, the concept can be extended to embodiments in which cancelling signals are developed by other means. For example, a search word can be stored in a memory location as disclosed in the cited Patent No. 3,292,159 and a semiparallel search can be performed. Alternatively and additionally, the cancelling signals can be developed by current sources, e.g. in lieu of being developed directly by memory elements.

The embodiments of the invention in which an exclusive property or privilege is claimed are defined as follows:

1. A matrix of memory elements respectively including $n$ rows of elements, each row comprising a memory location capable of storing a word, and Q columns of elements, each column including a correspondingly positioned memory element from each location, each of said elements capable of assuming at least two different states and responsive to being interrogated for developing bipolar output signals of substantially equal magnitude wherein a first bipolar signal is indicative of a first state and the opposite bipolar signal is indicative of a second state;

means for initially simultaneously interrogating all of the elements in those columns containing an element in a predetermined row assuming a first state to simultaneously develop sets of indicating signals, each signal of a given set indicating the state of a different one of the interrogated memory elements;

means for secondly simultaneously interrogating all of the elements in those columns containing an element in said predetermined row assuming a second state to simultaneously develop sets of indicating signals, each signal of a given set indicating the state of a different one of the interrogated memory elements; and means for effectively combining the signals indicating the states of elements in said predetermined row with signals indicating the states of elements in rows other than said predetermined row.

2. Apparatus for comparing a first multibit word stored in a first group of binary memory elements with a second multibit word stored in a second group of binary memory elements wherein said elements are responsive to being interrogated for developing bipolar output signals of substantially equal magnitude wherein a first bipolar signal is indicative of a first state and the opposite bipolar signal is indicative of a second state, said apparatus comprising:

first and second word sense lines respectively coupled to the elements of said first and second groups;

each of said elements in said first group being responsive to an interrogating signal applied thereto for providing an output signal indicative of its state on said first word sense line;

means for initially simultaneously applying an interrogating signal to each of said elements in said first group corresponding to elements in said second group in a first binary state and for applying an output signal to said second word sense line corresponding to each second group element in said first binary state;

means for secondly simultaneously applying an interrogating signal to each of said elements in said first group corresponding to elements in said second group in a second binary state and for applying an output signal to said second word sense line corresponding to each second group element in said second binary state; and sensing means connected to said word sense lines for developing a signal related to the difference between the output signals respectively provided thereon.

3. The apparatus of claim 2 wherein said sensing means includes means for connecting said first and second word sense lines in opposition.

4. A content addressable memory comprising:

a matrix of memory elements respectively including $n$ rows of elements, each row comprising a memory location capable of storing a word, and Q columns of elements, each column including a correspondingly positioned memory element from each location, each of said elements capable of assuming at least two different states;

a plurality of digit interrogate lines each of which is associated with all of the elements of a different one of said matrix columns;

a plurality of word sense lines each of which is associated with all of the elements of a different one of said matrix rows;

means for selectively storing a search word in a predetermined one of said memory locations;
means for selectively storing words in each of said other memory locations;
means for initially applying signals to each of said digit interrogate lines associated with a memory element in said predetermined location assuming a first state;
means for secondly simultaneously applying a signal to each of said digit interrogate lines associated with a memory element in said predetermined location assuming a second state;
each of said elements being responsive to a signal on the digit interrogate line associated therewith for providing on its associated word sense line a bipolar output signal of equal magnitude wherein a first bipolar signal is indicative of a first state or a bipolar output signal of equal magnitude and opposite polarity indicative of a second state; and
sensing means associated with each of said word sense lines for sensing whether an output signal appearing thereon is the same as or different from an output signal appearing on the word sense line associated with said predetermined location.

5. A content addressable memory comprising:
a matrix of binary memory elements respectively including *n* rows of elements, each row comprising a memory location capable of storing a word, and Q columns of elements, each column including a correspondingly positioned memory element from each location;
a plurality of digit interrogate lines each of which is associated with all of the elements of a different one of said matrix columns;
a plurality of word sense lines each of which is associated with all of the elements of a different one of said matrix rows;
means for storing a word comprised of all "0" bits in a first of said locations;
means for storing a word comprised of all "1" bits in a second of said locations;
a data register including Q stages, each stage storing a different bit of a search word corresponding in significance to the bits stored in a different one of said matrix columns;
each of said elements being responsive to a signal on the digit interrogate line associated therewith for providing an output signal on its associated word sense line indicative of its state;
switch means for successively connecting said word sense lines respectively associated with said locations storing said words comprised of all "0" and all "1" bits in opposition to all other word sense lines;
means for simultaneously initiating an interrogation current on each digit interrogate line associated with a data register stage storing a "1" bit while said word sense line associated with said location storing said word comprised of all "1" bits is connected in opposition to said other word sense lines;
means for simultaneously initiating an interrogation current on each digit interrogate line associated with a data register stage storing a "0" bit while said word sense line associated with said location storing said word comprised of all "0" bits is connected in opposition to said other word sense lines; and
sense amplifier means connected to each of said word sense lines.

6. In a content addressable memory including a matrix of non-destructive readout binary memory elements comprised of *n* rows of elements, each row comprising a memory location capable of storing a word, and Q columns of elements, each column including a correspondingly positioned memory element from each location and a data register including Q stages, each stage storing a different bit of a search word corresponding in significance to the bits stored in a different one of said matrix columns, means for comparing said search word with a word stored in each of said memory locations, said means comprising:
a plurality of digit interrogate lines each of which is associated with all of the elements of a different one of said matrix columns;
a plurality of word sense lines each of which is associated with all of the elements of a different one of said matrix rows;
means for storing a word comprised of all "0" bits in a first of said locations;
means for storing a word comprised of all "1" bits in a second of said locations;
each of said elements being responsive to a signal on the digit interrogate line associated therewith for providing an output signal on its associated word sense line indicative of its state;
timing means for defining successive first and second interrogation periods;
means for connecting the word sense line of said first location in opposition to all other word sense lines and for simultaneously applying signals to each digit interrogate line associated with a data register stage storing a "0" bit during said first interrogation period;
means for connecting the word sense line of said second location in opposition to all other word sense lines and for simultaneously applying signals to each digit interrogate line associated with a data register stage storing a "1" bit during said second interrogation period; and
sense amplifier means connected to each of said word sense lines.

7. The content addressable memory of claim 6 wherein each of said memory elements comprises a magnetic core having first and second orthogonally oriented apertures;
said digit interrogate line being threaded through said first aperture and said word sense line being threaded through said second aperture.

8. Apparatus for comparing a first multibit word stored in a multistage data register with a second multibit word stored in a first group of binary memory elements comprising:
means storing a word comprised of all "1" bits in a second group of binary memory elements;
means storing a word comprised of all "0" bits in a third group of binary memory elements;
a plurality of digit interrogate lines each of which is associated with elements in said first, second, and third groups storing bits of corresponding significance;
first, second, and third word sense lines respectively coupled to the elements of said first, second and third groups;
each of said elements being responsive to a signal applied to the digit interrogate line associated therewith for providing an output signal indicative of its state on the word sense line associated therewith;
first means for connecting said second group word sense line in opposition to said first group word sense line and for simultaneously applying signals to said digit interrogate lines associated with each data register stage storing a "1" bit;
second means for connecting said third group word sense line in opposition to said first group word sense line and for simultaneously applying signals to said digit interrogate lines associated with each data register stage storing a "0" bit; and
means for sensing resultant signals on said first word sense line.

9. The apparatus of claim 8 including a source of successive first and second timing signals;
said first means including a plurality of gates, each of which has an input terminal connected to a different one of said data register stages and all of which are responsive to said first timing signal;

said second means including a plurality of gates, each of which has an input terminal connected to a different one of said data register stages and all of which are responsive to said second timing signal;

each of said digit interrogate lines connected to a different one of said first means gates and a different one of said second means gates.

10. The apparatus of claim 8 wherein each of said memory elements comprises a magnetic core having first and second orthogonally oriented apertures;

said digit interrogate line being threaded through said first aperture and said word sense line being threaded through said second aperture.

References Cited

UNITED STATES PATENTS

| | | | |
|---|---|---|---|
| 3,206,735 | 9/1964 | Lee | 340—174 |
| 3,257,650 | 6/1966 | Koerner | 340—174 |
| 2,973,508 | 2/1961 | Chadurjian | 340—174 |

JAMES W. MOFFITT, Primary Examiner

U.S. Cl. X.R.

340—146.2